United States Patent [19]

Reichard et al.

[11] Patent Number: 5,039,073
[45] Date of Patent: Aug. 13, 1991

[54] MOUNT FOR CONTROLLING OR ISOLATING VIBRATION

[75] Inventors: Richard L. Reichard; Thomas A. Knurek; Terry L. Houston, all of Auburn; Gary L. Hipsher, Logansport, all of Ind.; Jamal J. Mousavi, St. College, Pa.

[73] Assignee: Cooper Tire & Rubber Company, Findlay, Ohio

[21] Appl. No.: 34,871

[22] Filed: Apr. 6, 1987
(Under 37 CFR 1.47)

[51] Int. Cl.$^5$ .............................................. B60K 5/00
[52] U.S. Cl. ................................. 267/140.1; 180/291; 180/312
[58] Field of Search ............... 180/312, 300, 291, 902; 267/140.1, 219, 140.1 R, 140.1 E

[56] References Cited

U.S. PATENT DOCUMENTS

| 3,642,268 | 2/1972 | Hipsher | 267/140.1 |
| 3,698,703 | 10/1972 | Hipsher | 267/140.1 |
| 4,516,545 | 5/1985 | Kumagai et al. | 180/312 |
| 4,687,188 | 8/1987 | Knurek et al. | 267/140.1 |

FOREIGN PATENT DOCUMENTS

| 0025459 | 3/1981 | European Pat. Off. | 180/312 |
| 0188101 | 7/1986 | European Pat. Off. | 180/312 |
| 3214037 | 10/1983 | Fed. Rep. of Germany | 180/312 |
| 2394715 | 1/1979 | France | 267/219 |
| 0022620 | 2/1979 | Japan | 180/312 |
| 0146421 | 11/1981 | Japan | 180/300 |
| 0152821 | 3/1983 | Japan | 267/140.1 |
| 0071220 | 4/1983 | Japan | 180/312 |
| 0179320 | 9/1985 | Japan | 267/140.1 |

Primary Examiner—David M. Mitchell
Attorney, Agent, or Firm—Joseph G. Nauman

[57] ABSTRACT

An isolating mount for connecting two parts or mechanisms includes a rigid bushing surrounded by a resilient block which includes closed cavities on opposite sides of said bushing located along a first plane parallel to the longitudinal axis of said bushing and a passage formed by pipes extending outside the mount between the cavities. A quantity of liquid fills the cavities and passage, providing a liquid column of predetermined inertia in the passage between the cavities for controlling the frequency and amplitude of forces transmitted through the bushing to provide tuning of the damping characteristics of the mount to preselected frequencies of vibration. A rigid outer body surrounds and contacts the block and exerts compressive force thereon substantially along the first plane. The bushing is connected to one of the two parts to be isolated and the outer body is connected to the other of the two parts. A fitting in the passage permits modification of the condition of the liquid, as by injection of liquid under predetermined pressure in the closed liquid damping circuit of the mount. Also disclosed are systems in which the effective length or diameter of the passage can be changed. Arrangements for interactively controlling such liquid injection, for example in response to engine or vehicle operating conditions, are also disclosed, along with (optionally) adjusting the opening of a metering valve connected to control flow in the passage.

7 Claims, 8 Drawing Sheets

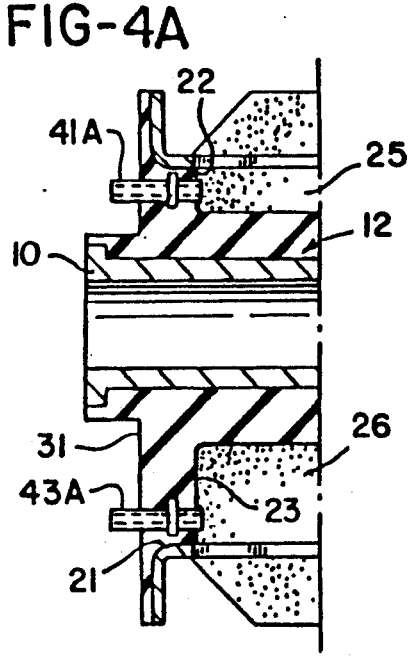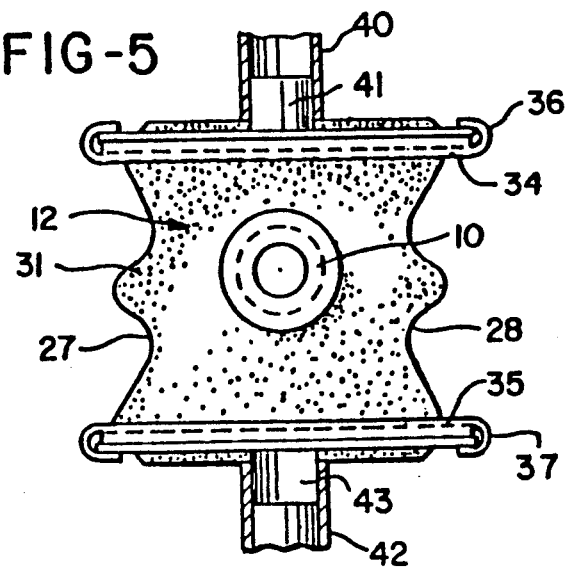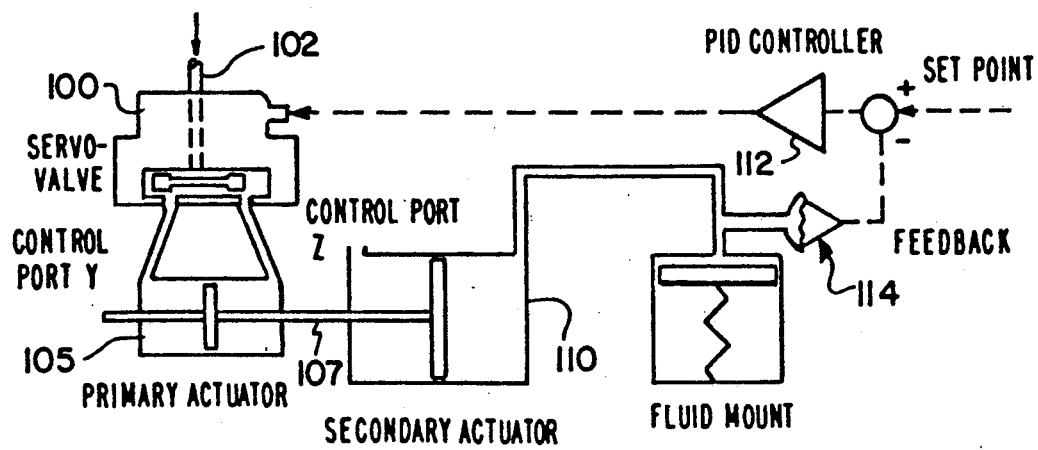

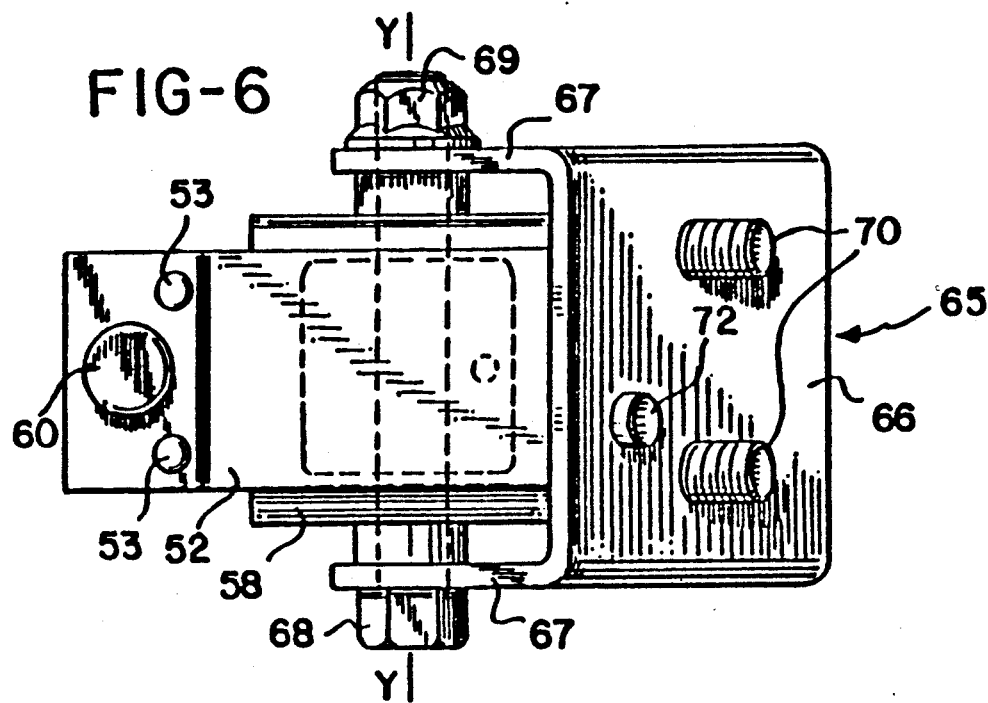
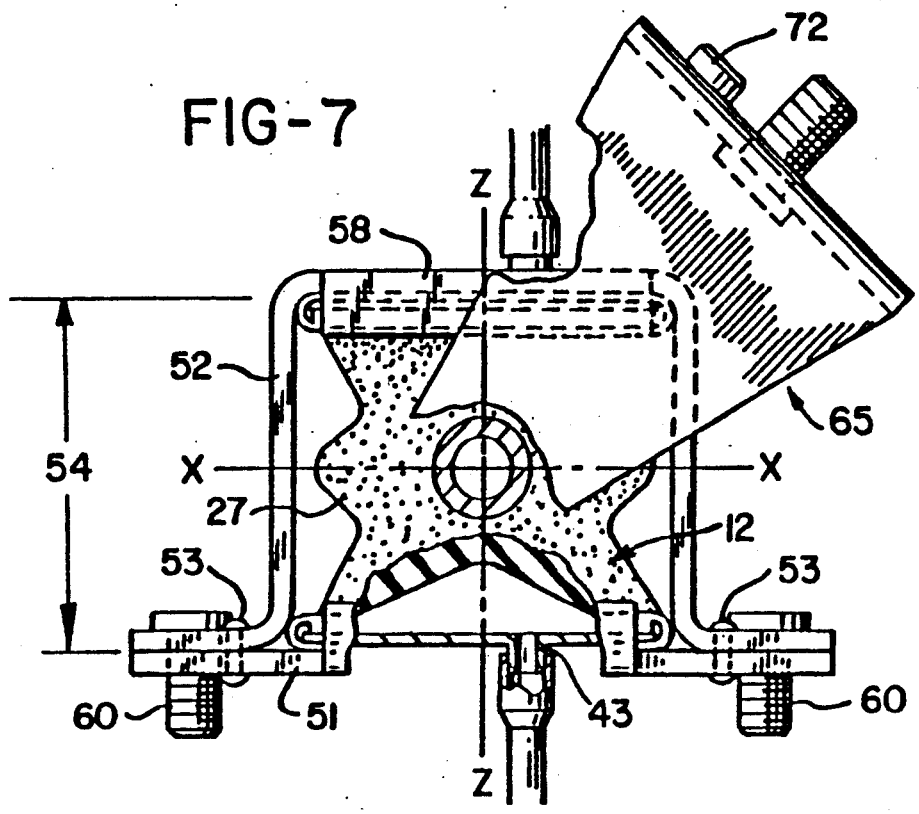

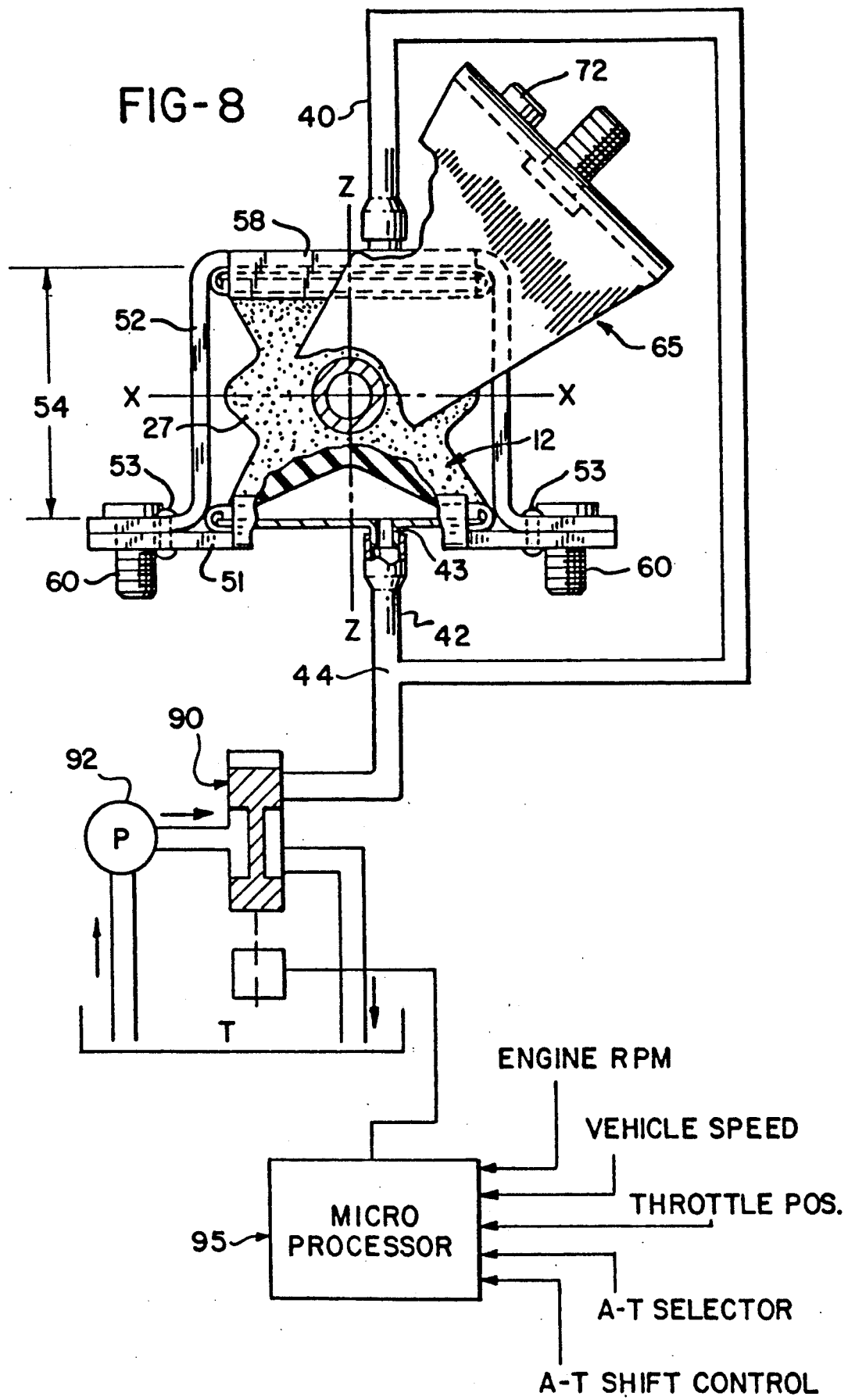

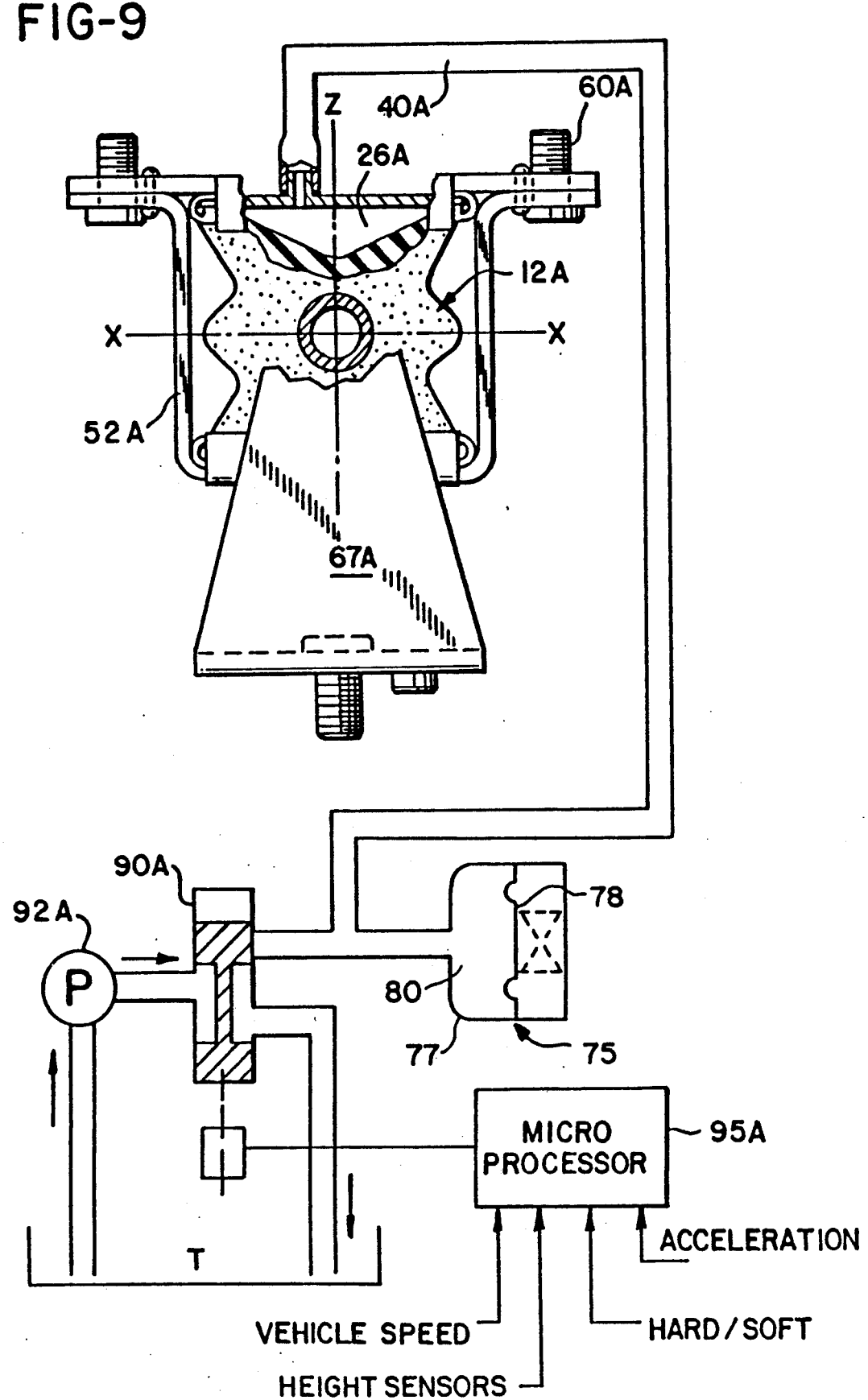

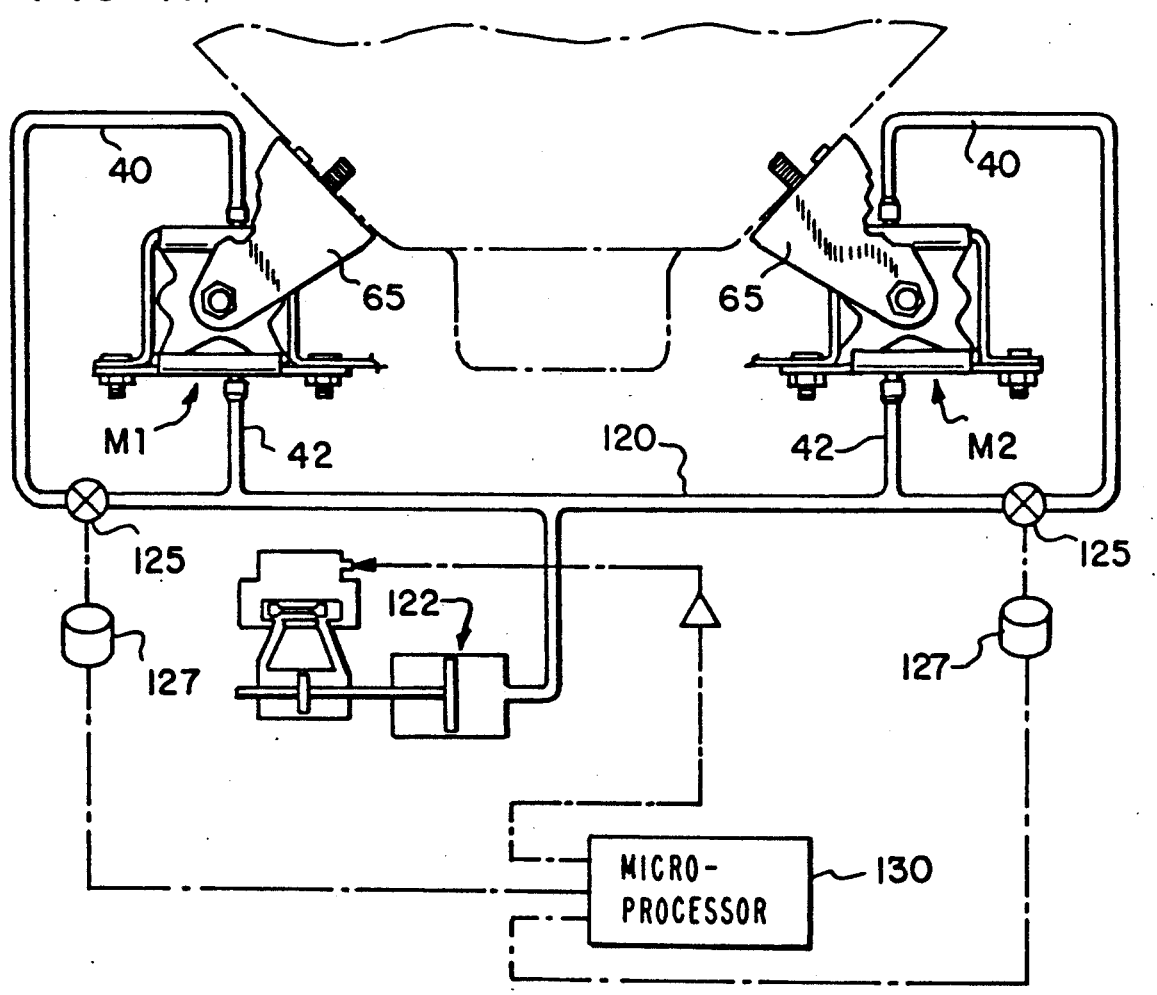

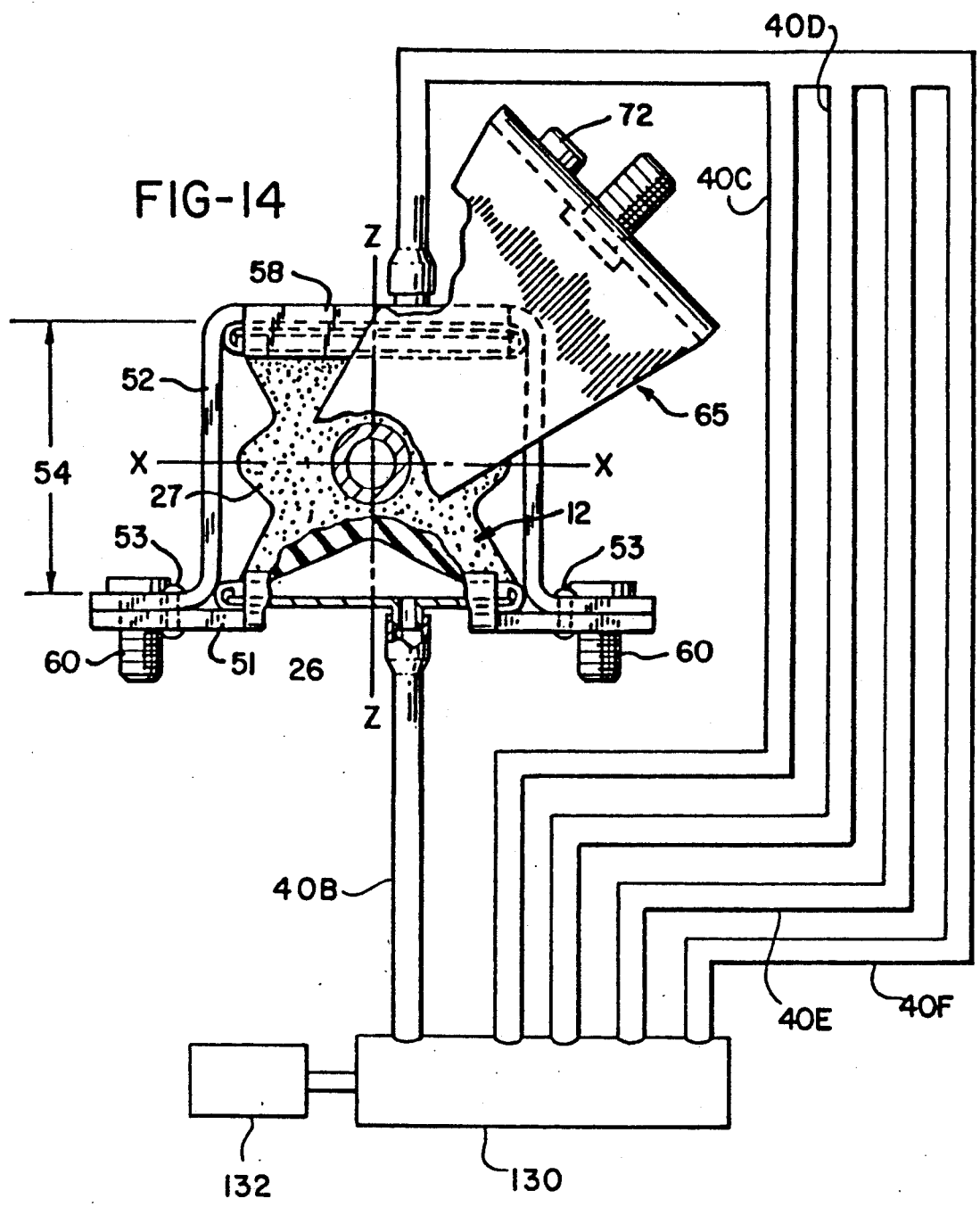

MOUNT FOR CONTROLLING OR ISOLATING VIBRATION

CROSS-REFERENCE TO RELATED APPLICATION

This application contains disclosure related to a co-pending applications Ser. No. 825,825, filed Feb. 4, 1986, now U.S. Pat. No. 4,687,188 and Ser. No. 829,676 filed Feb. 14, 1986, now U.S. Pat. No. 4,974,819 and assigned to the same entity as this application.

BACKGROUND OF THE INVENTION

This invention relates to a damped mount incorporating a resilient block and used for connecting two members while isolating and/or controlling the transfer of motion, and particularly motion due to vibration or shock, between these members. Mounts of the general type are described in U.S. Pat. Nos. 3,147,964; 3,508,745; 3,642,268; and 3,698,703.

The earlier type of mount disclosed in said U.S. Pat. No. 3,147,964, utilizes primarily the directed energy absorbing characteristics of a compressed rubber bushing to control the transmission of vibration between two members, and also to provide a certain amount of shock isolation in the mounting of one mechanical member to another, while still mechanically connecting the members as desired. These members can be any of a vast variety of devices such as different parts of mechanisms or vehicles, supports for machinery, and packaging supports for large masses. Of particular interest are the connections of chassis and body parts in vehicles and/or the mounting of an engine in an automobile, which requires control and isolation in six different degrees of freedom, namely motion along X, Y and Z axes and rotation about these axes, namely roll, pitch and yaw. In this area of application alone, the modern demands for vibration control/isolation and adequate support and anchoring present sophisticated mount design requirements which are aggravated by the need to accomodate some degree of misalignment which is to be expected in mass production systems.

The aforementioned '268 and '703 patents disclose such mounts wherein the action of a resilient (such as rubber) member incorporated in the mount is modified by the placement of a damping liquid in cavities located on opposite sides of and within the resilient member. These cavities are connected through a passage which restricts the flow of the liquid between the cavities, thus further damping the motion of the resilient member along a plane extending through the two cavities. Mounts such as these are designed to handle predetermined loads and damp at certain predetermined frequencies, but they are unable to interact with changing conditions involving the supported member, such as an engine undergoing operating change due to varying load, etc. An interactive mount, on the other hand, can respond to signals indicating changes in engine operation, or changes in suspension demands, and change its spring rate, or its damping capacity, temporarily to accomodate changes of a temporary nature accompanying vehicle operations.

Various types of interactive engine mount and suspension components and systems have been used and/or described in publications related to the automotive industry. These are characterized by having high/low or hard/soft controls, e.g. selectable between two different characteristics, and also by use of mount structures which are direction sensitive to applied loads. The selection of higher or lower damping characteristics has been achieved by choosing between two different sizes of orifice in a bleed passage between hydraulic chambers in a mount, or by changing the opening of a valve in a strut-type mount. The mount structures used in these prior art devices are generally strut-type and have poor tolerance for forces applied off the axis of the strut. Typical such devices and systems are disclosed in SAE Technical Papers No. 840258 and 840259, presented at an International Congress & Exhibition in Detroit, Mich. and Copyright 1984 by the Society of Automotive Engineers, Inc., and in Machine Design magazine, Nov. 11, 1982, pages 86,87, describing a Lucas Girling Ltd. system.

SUMMARY OF THE INVENTION

An isolating mount for connecting two parts or mechanisms, such as for mounting an engine in a compartment, includes a rigid bushing surrounded by a resilient block of rubber or the like having one or more cavities adjacent but spaced from the bushing, preferably a pair of cavities located along a first plane parallel to the longitudinal axis of said bushing. A passage leads from the cavity, or between the cavities, and a quantity of liquid fills the cavities and passage, providing a liquid column of predetermined inertia in the passage for controlling the damping of forces transmitted through the bushing and to provide tuning of the spring rate and damping characteristics of the mount to preselected forces and frequencies of vibration. A rigid outer body surrounds and contacts the block and exerts compressive force thereon. This force may be selective, for example substantially along the first plane, to pre-load the block under compression. The bushing is connected to one of the two parts to be isolated (for example a support attachment pad on an engine) and the outer body is connected to the other of the two parts (for example bolted to an appropriate part of a vehicle engine compartment).

The liquid is confined within the cavities and passage so displacement of the block in response to forces acting on or through the mount will result in displacement of liquid through the passage from one cavity to the other, or from a single cavity to an appropriate external pressurized chamber or source. The copending application (CTC 008 P2) teaches how to provide between the cavities a connecting passage or bleed of proper size and shape to tune the mount to desired damping characteristics, by lengthening the passage and varying the cross-sectional opening through the passage to provide a column of liquid of predetermined inertia which will function as a fluid oscillator of predetermined frequency. Selection of proper length and diameter of the passage will provide a mount having a suitable damping ratio for the application.

The present invention deals with a number of embodiments which provide a substantial change in the flow characteristics of the liqid circuit of the mount. One embodiment provides a connection into the liquid circuit to an external source of the liquid under considerable pressure, together with controls responsive to engine operating conditions, or vehicle operating conditions, which will cause pressurization of the liquid circuit beyond its normal pressure. Embodiments are described for engine mounting and chassis/body connection. The principal object of this invention is, therefore, to provide a novel interactive mount for connecting two parts or mechanisms, for example such as mounting an engine in an automobile engine compartment or supporting and connecting body parts to a vehicle chassis; to provide such a mount which includes a rigid bushing surrounded by a resilient block having at least one cavity located in predetermined spaced relation to the bushing, and preferably two cavities formed on opposite sides of the bushing along a plane parallel to the longitudinal axis of said bushing, and in which a passage of predetermined diameter and length extends from the cavity or cavities, and a quantity of liquid fills the cavity (or cavities) and passage, providing a liquid circuit including a column of predetermined inertia in the passage such that displacement of the block in response to external forces results in displacement of liquid from a cavity through the passage thereby providing tuning of the damping characteristics of the mount to preselected frequencies of vibration; and to provide connection to a source of liquid pressure externally of the liquid circuit and controls responsive to engine and/or vehicle operating conditions whereby the pressure in the mount's liquid circuit can be substantially increased.

Other objects and advantages of the invention will be apparent from the following description, the accompanying drawings and the appended claims.

BRIEF DESCRIPTION OF THE DRAWINGS

FIG. 4A is a view similar to FIG. 4, showing a modified form of connecting external liquid passages into the internal cavities of the mount;

FIG. 5 is a side elevational view of the central assembly with the covers attached and showing fittings for attachment of external passages;

FIGS. 6 and 7 are top and side elevational views, respectively, with part of FIG. 7 broken away, showing the completed isolating mount and an attached coupling bracket;

FIG. 8 is a view showing a mount as in FIG. 7, with the addition of a schematic diagram of an engine condition responsive system providing interactive control for the mount;

FIG. 9 is a view similar to FIG. 8, showing a schematic diagram of a (condition responsive system) for vehicle suspension providing control input to the mount, and using a single cavity form of the mount;

FIG. 10 is a diagram of another form of electro-hydraulic control for changing the pressure in a mount hydraulic circuit;

FIG. 11 is a diagram of another electro-hydraulic control circuit which will change pressure in a mount control circuit and also modify a metering valve connected in the external circuit of a mount;

FIG. 14 is a schematic diagram of another form of control system for the mount, using selectable different lengths of external liquid passages.

DESCRIPTION OF THE PREFERRED EMBODIMENT

Figure 1:
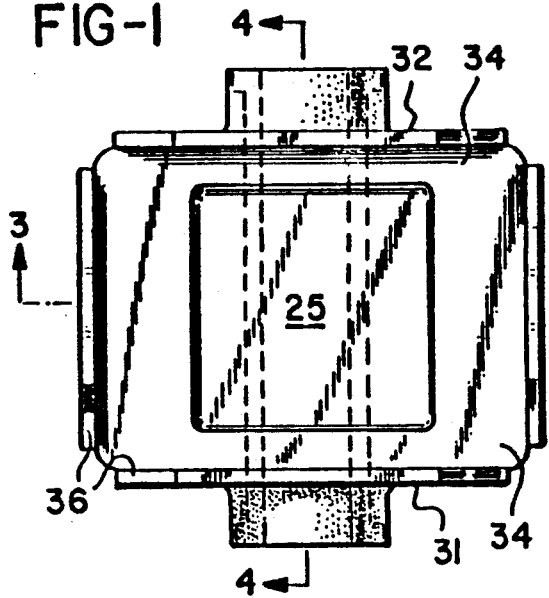
FIG. 1 is a plan view of the central assembly of an isolating mount according to the invention.

Referring to the drawings, a mount constructed in accordance with a preferred embodiment of the invention is intended to accomodate and control motion between two parts over six different degrees of freedom. For an understanding of the following description, the transverse axis is designated X—X in FIG. 7, the longitudinal axis is designated Y—Y (FIG. 6), and the vertical axis is designated Z—Z in FIG. 7. Mounts provided by the invention control motion along planes containing these axes, and also control motion in rotation about such axes.

The mount provided by the present invention has a central assembly which includes a rigid (such as steel) tube 10 or bushing around which is molded, and bonded to the tube, a resilient mass or block 12 of rubber or equivalent distendable material. The bushing 10 is intended to have its longitudinal axis parallel to, or coincident with, the Y—Y axis. The top 14 and bottom 15 of the block 12 have generally parallel relatively flat surfaces 20 and 21 with openings 22 and 23 therein which define the outer open boundaries of a pair of cavities 25 and 26 molded into the block. These cavities are located opposite (top and bottom) the tube or bushing 10, preferably but not necessarily centered along a plane which bisects the longitudinal axis of the tube, and which contains the Z—Z axis.

The sides 27 and 28 of the block transverse to the X—X axis are formed to a selected contour, usually being mirror images of each other. In general, the "hour glass" shape illustrated provides desired resistance of the mount to displacement of the tube 10 and the block along the transverse or X—X axis of the mount. The central outwardly extending rib on these sides, indicated at 29, provides bumpers which will contact rigid mount structure (as later described), should such displacement be excessive, and thereby introduce compression resistance of the block material to such excessive movement. The other or fore/aft sides 31 and 32 of the block 12 are essentially flat, but with the ends of the tube or bushing 10 protruding therefrom. If desired, the sides 31, 32 may also be contoured to introduce controlled resistance along the Y—Y axis and/or to modify the spring rate along the Z—Z axis.

Figure 3:
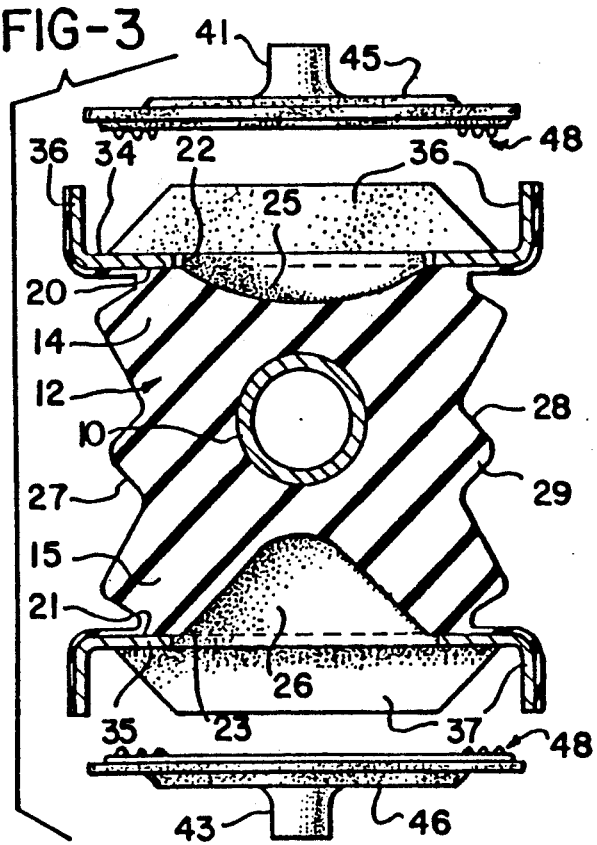
FIG. 3 is a cross-sectional view taken along line 3—3 in FIG. 1, with covers shown in elevation positioned for attachment.

The top and bottom 14 and 15 have respective plates 34 and 35 (referred to hereafter as end plates) molded and thus bonded thereto, with central openings that coincide with the openings 22 and 23, and with outwardly extending flanges 36 and 37 on their respective perimeters. Covers 45 and 46 are provided to seal the open ends of the cavities 25,26. These covers may be constructed as rubber coated rigid (such as metal) plates onto which seal lips or rings 48 are molded (FIG. 3), or they may be formed of a corrosion resistant material such as a glass fiber filled resin, to seal against similar seal rings or lips molded onto the outward facing surfaces of the end plates 34,35. In either case, the covers are sized to fit within the top and bottom plates, being insertable within the flanges 36,37 to fit in sealing relation over the openings 22 and 23, and to be clamped into tight sealing relation with the top and bottom plates and the adjacent portions of the block, to which these end plates are bonded, in order to close the cavities 25 and 26. The flanges 36 and 37 are tightly formed around the edges of the covers to complete the central assembly, as shown in FIG. 5. It should be noted that rubber material may be bonded around the surfaces of the flanges 36,37 and thus there is a rubber surface facing outwardly of the subassembly.

Figure 4:
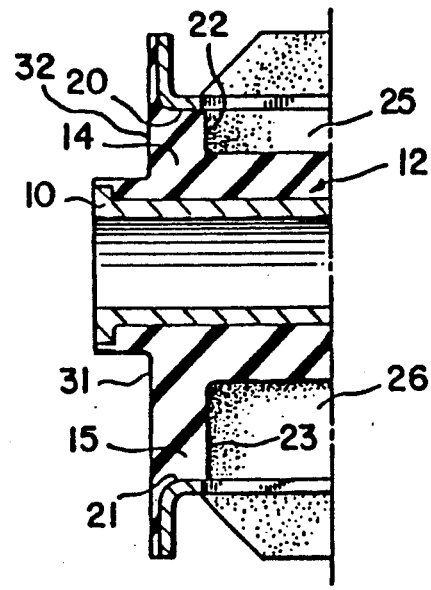
FIG. 4 is a partial cross-sectional view taken along line 4—4 in FIG. 1.
Figure 12:
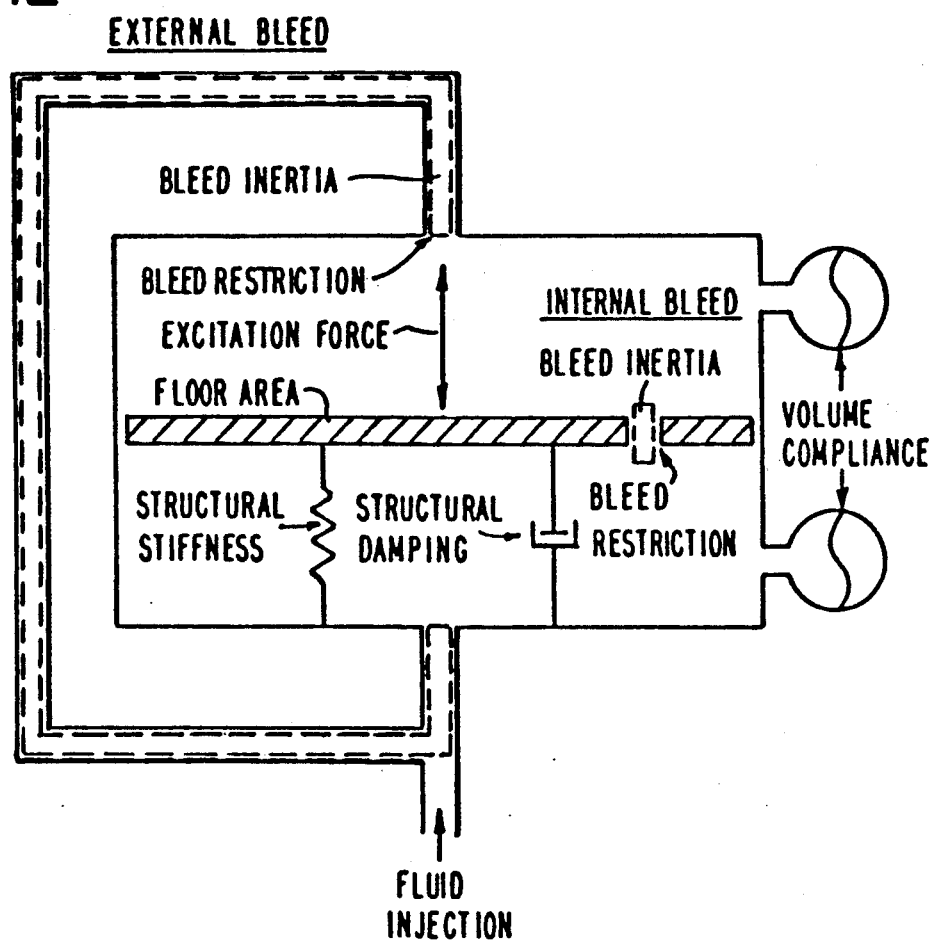
FIG. 12 is a diagram of a dual cavity mount, with legends explaining the inter-relation of the mechanical/hydraulic components of the mount.

External pipes 40 and 42 extend from the cavities, forming a connecting passage between the cavities of substantially less cross-sectional area than the cavities themselves. These pipes may be connected to the cavities 25,26 by suitable fittings 41, 43 formed from the covers 45,46 as in FIG. 3, or through nipples 41A, 43A molded into the side 31 of block 12 and communicating with the cavities, as shown in FIG. 4A. The length of the pipes 40 and 42 can be adjusted to change the length of the liquid column as dictated by a particular design of mount. To increase the stiffness of the mount, a tee fitting 44 (FIG. 8) is included in the connected pipes 40,42 as shown. The cavities and the connecting passage are intended to be filled with a suitable damping liquid. Ethylene glycol or glycerine are typical liquids used for this purpose.

The central assembly is placed between two complementary parts 51 and 52 (FIG. 7), formed of steel or the like and intended to be joined, as by rivets 53 to form a rigid outer body on the completed mount. The top to bottom dimension 54 within the part 52 is less than the top to bottom outer dimension 54 of the central assembly (FIG. 5) by an amount which is calculated to require a predetermined compression of the central assembly along the Z—Z axis to bring the parts 51 and 52 into contact, after which these parts are then joined into an effectively integral outer body or shell. The sides 27 and 28 may be relieved, however, and not contact the outer body part 52 under normal static conditions as shown in FIG. 7.

The outer body, therefore, exerts a selective compressive force upon the central assembly, and particularly upon the resilient block or mass 12. In the illustrated embodiment this force is along the Z—Z axis longitudinally bisecting the bushing 10. The ends of the outer body are essentially open, having only short flanges 57 and 58 formed from the body parts 51 and 52, to retain the central assembly but leaving the ends of bushing 10 free to move within the limits permitted by the constraints on the block 12 and the resistance of that block to external forces acting on the bushing while the outer body is confined or held. The flanges 57,58 must at the minimum be of sufficient dimension to restrain all movement of the end plates 34,35 within the outer body along the Y—Y axis. The flanges 57,58 may be extended toward bushing 10 so as to provide a restraining surface that will cooperate with a suitably contoured surface on the ends 31,32 thereby providing controlled resistance to along the Y—Y axis and/or control of spring rate along the Z—Z axis. Furthermore, the outward facing coating of rubber on the flanges 36,37 provides a metal to rubber interface between the subassembly and the outer body at their contacting locations, contributing to the isolation capability of the mount since there are two complete rubber/metal interfaces between bushing 10 and the outer body or shell of the mount.

Referring to FIGS. 6 and 7, the outer body is provided with suitable support or coupling means for attaching it to one of two members (not shown) to be coupled and vibrationally isolated. For example, appropriate mounting bolts 60 extend through holes 62 formed in the overlapping attached parts of the members 51 and 52, and these bolts 60 may thread into support pads in a vehicle engine compartment. The size and location of these bolts and corresponding holes may vary for any particular design. A mounting bracket in the form of a clevis 65, having a base part 66 and outwardly extending arms 67, is attached to the bushing 10 by a through bolt 68 which is secured with a locking nut 69. This arrangement may allow some rotation of the clevis around the axis of the bushing, or this connection may be rotationally rigid, as by use of non-circular bushing and bolt, an intervening key or similar means, depending upon the requirements of the particular use and installation of the mount. The base 66 of the clevis is provided with attaching bolts 70 and may include an orienting or alignment pin 72; the bolts 70 might for example be used to attach the clevis to a mounting pad on an engine block.

Figure 2:
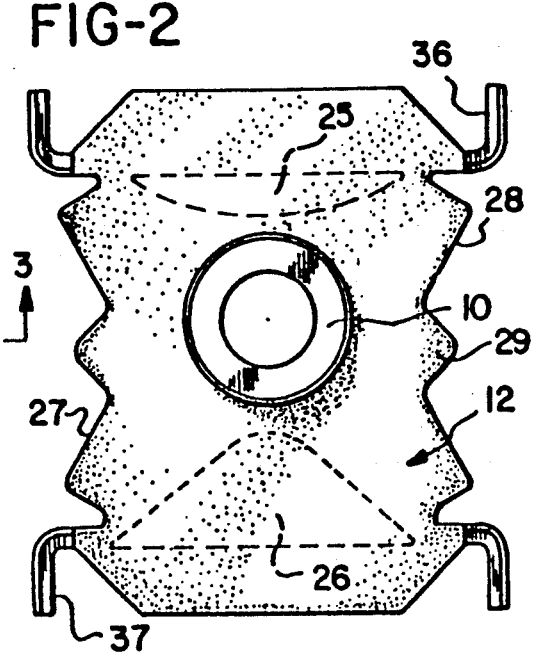
FIG. 2 is a side elevation view of the central assembly as shown in FIG. 1.

It should be noted by comparing FIGS. 2 and 5 with FIG. 7 that the longitudinal axis of bushing 10 may be originally offset upward from the X—X and Y—Y axes. The reason for this is to design the mount for a predetermined static load, such as its portion of engine weight. Thus when the subassembly is built, the bushing is displaced upward from the ultimate Y—Y axis alignment, and when the mount is in place (assumed in FIG. 7) the static load on the mount will result in the bushing axis and the Y—Y axis coinciding.

Figure 13:
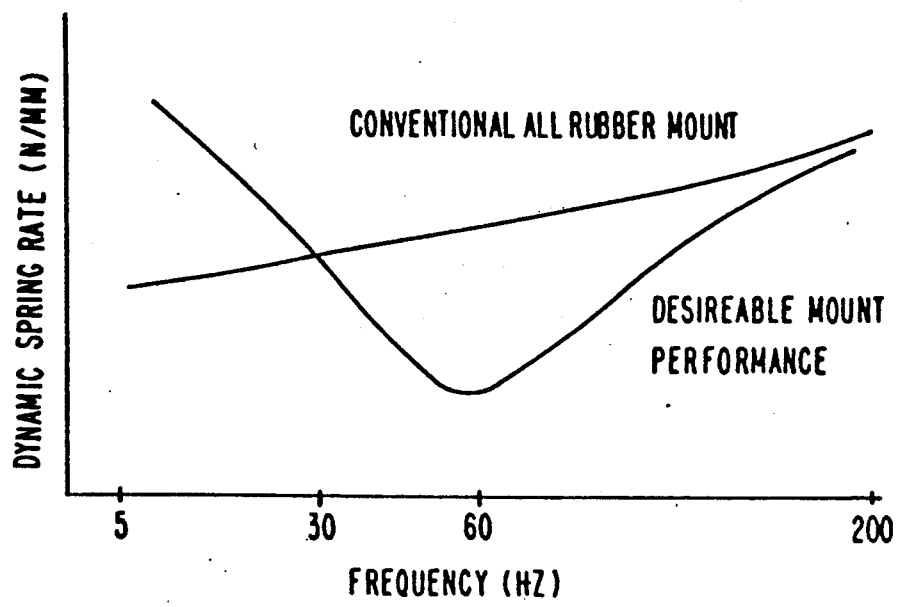
FIG. 13 is a graph showing a comparison of a mount such as provided by the invention with a conventional all rubber mount.

FIG. 13 illustrates a plot of a hydraulically damped mount compared with a conventional all rubber mount. The conventional mount exhibits a spring rate that increases somewhat, but generally as a straight line, with increase in the frequency of vibration imposed on the mount. In contrast, a controlled damped mount will exhibit a significantly reduced spring rate at (or around) a predetermined frequency. The present invention provides control systems which can override this predetermined damping action, and change the spring rate and/or damping action of the damped mount when certain operating conditions of the mount's environment are encountered.

One of the advantages of a mount built according to the invention is its capability to accommodate off center or off-axis loading. Of necessity, certain mount installations such as the engine mounts of an automobile, must be capable of accommodating a wide variety or static and dynamic forces such as static load, operational vibration, torque and road surface vibrations and impacts. In designing a mount installation for a specific purpose such as an automobile engine mount, it is imperative that the relative magnitude of each of the variety of static and dynamic forces be considered in conjunction with the directional orientation of each such force and its resulting motion.

The optimal result of support, load bearing and damping of mounts disclosed in this application will be achieved by orienting the placement of the mount to locate the Z—Z axis on the centerline (or plane) along which the major static and dynamic forces and the relative motion resulting therefrom is expected to occur. A distinct advantage of the mounts disclosed in this application is the unique demonstrated ability to functionally control (support and dampen) static and dynamic forces and the relative motion resulting therefrom, at angles up to 45° displaced from the optimum Z—Z axis. Taking into consideration the normal dimensional tolerance experienced in mass production of large machinery, and also considering the fact that in the case of modern engine installation (particularly in automobile construction) the compartment structure may flex considerably under various loads and stresses, it can be appreciated that this accomodation characteristic of the present mount provides significant advantages.

The present invention is particularly concerned with modification of the hydraulic damping and spring rate action of the mount. It has been found that inertial or mass resistance to flow of liquid through the passages 40, 42 is a more dominant parameter than the size of the restriction (e.g. orifice) presented to flow by the cross-sectional size of the passage or any restriction introduced into the passage. This is explained in greater detail in copending application Ser. No. 829,676.

The key parameters identified in investigation of a mount as shown in FIGS. 1-7 are the stiffness (spring rate) and the damping due to the rubber structure of the mount, the fluid inertia in the connecting passage 40, 42, flow restriction in the connecting passage, and volume compliance of the cavities 25, 26. It has been found that tuning of the response of the mount can be achieved by lengthening the extent of passage 40, 42 to provide an extended column of fluid in the passage which, by reason of its inertia, modifies the time/rate characteristics of the transfer of liquid between the chambers 25 and 26. It has been discovered that without attention to these relationships, it is possible for the mount at certain frequencies to exhibit a condition in which the hydraulic damping action of the liquid filled and connected cavities will actually occur in phase with the vibration which it is sought to damp, and thus produce a counter-productive amplification of the vibration at certain frequencies.

Mounts of this type are generally characterized in terms of their stiffness and damping rates versus frequency. This is explained in a paper entitled "A Review of Recent Developments in Forced Vibration Dynamic Testing of Elastomers" by B. M. Hillberry, Rubber and Related Products: New Methods of Testing and Analzing, ASTM STP 553, American Society for Testing and Materials, 1974, pp. 142-161. A Voight model representation provides a way of illustrating the various effects of the components in such a mount, and this is shown in FIG. 11.

The liquid in the passage 40, 42 functions as a fluid oscillator and using an analogy between the fluid oscillator and a spring-mass-damping system provides insight into the effects of the design of this passage. Particularly of interest are the nondimensional damping ratio and the natural frequency of the fluid oscillator. Varying the ratio of length to internal diameter in the design of passage 40, 42 changes both the resonant frequency and the nondimensional damping rate at the same time. For example, if both the diameter and length are increased by 10% the natural frequency will be increased by 5% while the nondimensional damping will be increased by 25%.

At this point it should be mentioned that in some mounts embodying the present invention it may not be desirable to include two cavities within the resilient block of the mount. It is possible to achive hydraulic damping using only a single cavity as shown in FIG. 9. Like parts are designated by the same reference numerals, with the suffix A. The outer body is inverted from the form shown in FIGS. 6 and 7, the lower cavity is omitted, and the upper cavity 26A is connected through an external passage tube 40A to an accumulator type of device 75 which includes a housing 77 having an internal diaphragm or bladder 78 that forms one wall of a closed chamber 80. The other end of tube 40A is connected to chamber 80, and the side of the bladder 78 opposite chamber 80 is exposed to force such as predetermined fluid or spring pressure (shown schematically), tending to reduce the volume of chamber 80. Thus the hydraulic damping circuit in this type of mount will comprise the internal mount chamber 26A, passage 40A, and the chamber 80.

In either the double or single cavity embodiment the present invention provides a means for substantially increasing the pressure of liquid in the mount's hydraulic circuit. Referring first to FIG. 8, the tee fitting 44 is connected via a solenoid operated (or equivalent) valve 90 which controls the output of a hydraulic pump 92 which draws liquid, e.g. typical hydraulic fluid, from a tank or reservoir T. The pump output, assuming the pump is dedicated to this function, is bypassed back to the tank when valve 90 is positioned as shown. There may in fact be several such engine mounts all connected to the same pump, but a single mount is shown to simplify the illustration. If only one or two mounts of this type are needed, the pump may also have other functions, such as the power steering pump in a vehicle, provided the pump is chosen of sufficient capacity. A microprocessor 95 is connected to control the valve 90, and in turn the microprocessor has signal inputs which relate to various engine operating conditions, such as the engine r.p.m., the vehicle velocity or speed, the throttle position (in the case of a carbureted or gasoline fuel injected engine), the position of the automatic transmission selector, where such a transmission is fitted, and the position of the shift control valve of such automatic transmission.

These signals are processed and result, for example, in an output signal from the microprocessor anticipating or indicating a need for a change in the characteristics of the mount. Shifting the valve 90 causes the high pressure output of the pump 92 to be injected into the hydraulic circuit of the mount, and the rise in pressure results in a substantial increase in the spring rate, i.e. stiffening, of the mount, as to resist a momentarily encountered change in engine operating conditions. This might be, for example, to limit engine motion in the mount or mounts as a reaction to sudden increased torque demand, or sudden deceleration, or some other condition. The control may be essentially digital, providing either normal or high (e.g. 60 to 90 psig) pressure in the mount circuit, or the microprocessor output may be variable and the control valve 90 moved proportionally to provide different chosen pressures in the mount circuit.

Referring to FIG. 9, an interactive control arrangement similar to that shown in FIG. 8 is illustrated for a single cavity mount (previously described) wherein a valve 90A, under the control of a microprocessor 95A, is connected to direct the flow from a pump 92A either into the mount control conduits, or through a by-pass back to tank T. The mount is illustrated inverted, in that the outer body has its attaching bolts facing upward and the clevis 67 A faces downward. Such an orientation would be typical when using the mount as part of a suspension system or the like. As previously noted, there is a single cavity 26A communicating with the pipe or passage 40A. It should be understood, however, that two or more such mounts could be attached in parallel to the passage 40A in certain installations.

The microprocessor is shown as receiving input signals which are indicative of conditions and changes in vehicle speed (velocity), vehicle acceleration, a selector (which can be automatic) between a hard and a soft suspension, and one or more sensors recognizing vehicle body height (e.g. the supporting effort of the suspension in lifting the body to a desired road clearance). Changes in these signals, and their interrelation, will be compared by the microprocessor, which in turn will cause appropriate action of valve 90A to inject or remove liquid into or out of the passage 40A, thereby changing the spring rate of the mount as needed.

FIG. 10 shows another form of control for either of the embodiments shown in FIGS. 8 or 9. A conventional electro-hydraulic pilot or servo valve 100 receives hydraulic fluid under pressure from a suitable source, indicated at 102. This source could be a part of some hydraulic system on a vehicle, for example, or a dedicated pump (not shown). The servo valve controls the flow in and out of hydraulic fluid to a primary actuator motor 105, which has its piston connected by rod 107 to the piston of a secondary or slave actuator 110. The secondary actuator in turn is hydraulically connected to the inertial column passage of the mount or mounts, in the same manner as pumps 92 or 92A. Movement of the secondary piston to the right, as viewed in FIG. 10, will increase the pressure in the mount hydraulic circuit accordingly.

The operating signal to the servovalve unit 100 is obtained from a conventional control amplifier 112 which has a set-point input control to determine the condition at which the controller actuates. Feedback is obtained from a pressure transducer 114 which senses the pressure in the mount hydraulic circuit.

FIG. 11 shows diagramatically an arrangement of two double chamber mounts, according to the invention, used to support an internal combustion engine (partially shown in phantom lines). The mounts are designated M1 and M2, and are of the type described above in connection with FIGS. 1-7, and are bolted to suitable engine compartment pads or brackets, and each has its mounting clevis 65 attached to pad structure on the engine. The external circuit tubes 40, 42 are joined to a common hydraulic pressure line 120 which may be connected, for example, to an actuator piston 122, of the same type as the secondary actuator in FIG. 10. In each of the external circuits of the mounts there is a metering valve 125, and each valve is adjustable by a suitable stepping motor control 127, whereby an adjustable restriction is provided in the external circuit, as also described in application Ser. No. 829,676.

A computer 130, having suitable inputs such as described in connection with FIG. 8, provides control signals to the servo valve of the primary actuator (as in FIG. 10) to change the hydraulic pressure in the mount control circuit by adjsuting the secondary actuator piston 122. In addition, the computer is connected to stepping motors 127, to change the setting of the metering valves 125, so as to modify further the damping characteristics of the mounts.

FIG. 14 illustrates another control arrangement which can be used when the different characteristics desired of the mount are predictable, for example to change the predominant damping frequency to a different predetermined value. In this embodiment the same double cavity mount construction is shown, although again the control is applicable to a single cavity design. The function of this control is to cause the effective length of passage 40 to change by predetermined length.

A common passage 40B is connected to the bottom cavity 26, and a plurality of pipes 40C-40F are connected into the top cavity 25 and extend to a selector valve 130, which is moved to interconnect passage 40B with a selected one of the pipes 40C, 40D, 40E or 40F. A controller 132 operates the selector valve in response to a control signal identifying the length of passage desired for damping response under different conditions.

While the forms of apparatus herein described constitute preferred embodiments of this invention, it is to be understood that the invention is not limited to these precise forms of apparatus, a d that changes may be made therein without departing from the scope of the invention which is defined in the appended claims.

What is claimed is:

1. An engine mount for use in a vehicle, comprising
a rigid bushing,
a resilient rubber block molded around said bushing, said block having generally rectangular top and bottom walls, symetrically shaped side walls which are generally parallel to said bushing, and front and back walls through which said bushing protrudes,
said block including means defining at least one cavity opening to the exterior of said block through one of said top and bottom walls and extending into said block but spaced from said bushing,
means defining a passage leading from said cavity, said passage being of substantially lesser cross-section than said cavity,
a quantity of liquid filling said cavity and said passage,
a rigid outer body surrounding said block but spaced from said side walls and leaving said front and back walls open to the exterior of said outer body at least in the regions surrounding the ends of said bushing,
means for coupling said bushing to an engine and for connecting said outer body to a vehicle engine compartment to provide support for the engine;
cover means held in sealed relation over said cavity whereby said liquid is confined within said cavity and said passage and distortion of said block in response to forces acting on the mount will result in displacement of said liquid through said passage; and
means responsive to changes in engine operation for modifying the condition of said liquid to increase resistance to distortion of said block and to stiffen the support of the engine temporarily.

2. An isolating mount as defined in claim 1, wherein said means for modifying conditions of said liquid includes means for temporarily increasing the pressure of the liquid to modify the spring rate and damping action of the mount.

3. A mount as defined in claim 2, wherein the means for increasing the pressure of said liquid includes means responsive to changes in vehicle operation.

4. An isolating mount as defined in claim 2, wherein the means for modifying conditions of the liquid also includes adjustable valve means in said passage.

5. An isolating mount as defined in claim 1, wherein said means for modifying condition of said liquid includes a selectively actuated pumping means connected into said passage, and means for operating said pumping means in response to a desired change in the operating response of the mount.

6. An isolating mount as defined in claim 1, wherein a plurality of separate liquid filled passages containing different masses of liquid are connected in parallel to said cavity, and selector valve means connected between each of said passages and said cavity and operable to substitute a selected one of the passages into circuit with said cavity to selectively vary the dampening and spring rate of the mount.

7. An isolating mount as defined in any of claims 1 through 6, wherein said rubber block has formed in it a pair of cavities located on opposite sides of said bushing, said cavities being located along a plane extending through said bushing and through said top and bottom walls of said outer body, and said passage connects said pair of cavities.

* * * * *